May 10, 1938.  P. S. BEAR  2,116,994
FISH LURE
Filed July 9, 1936
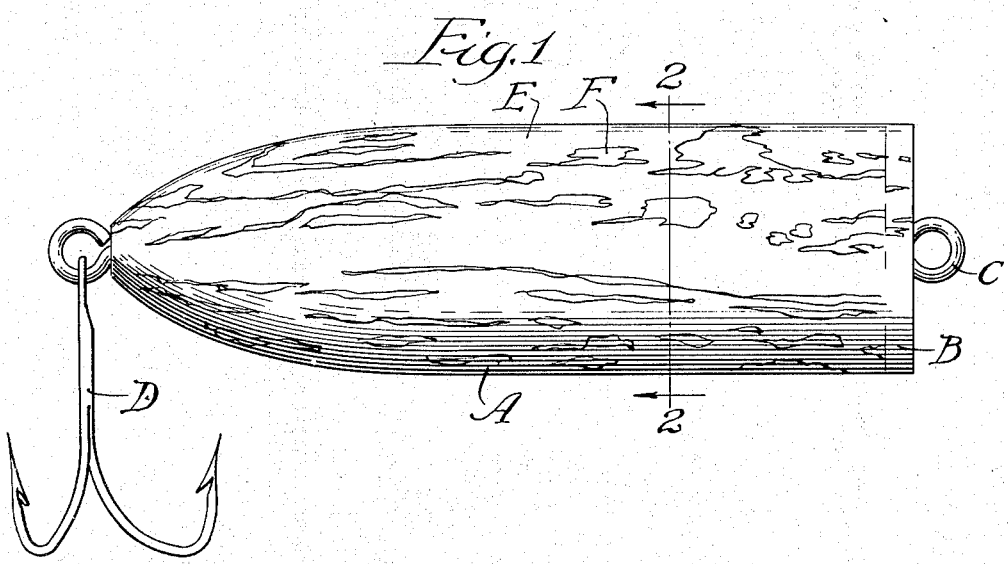
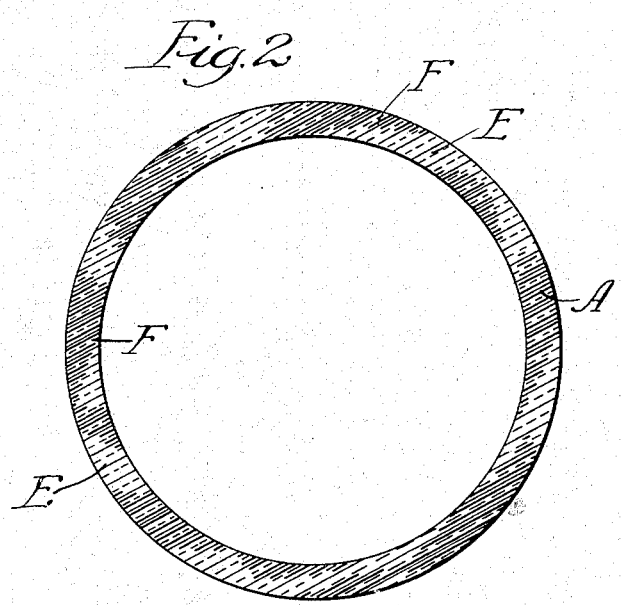
Inventor:
Paul S. Bear,
By Danning & Danning
Attys.

UNITED STATES PATENT OFFICE 2,116,994

FISH LURE

Paul S. Bear, Elkhart, Ind., assignor to James Heddon's Sons, Dowagiac, Mich., a corporation of Michigan Application July 9, 1936, Serial No. 89,805

1 Claim. (Cl. 43—46)

The present invention is directed to a bait body formed of transparent or semi-transparent material such as pyralin or the like, which has interspersed therethrough flakes or patches of completely or partially opaque character, so that the resulting bait body will present a partially mottled or clouded appearance which gives to the bait body a distinctive character, which tends to simulate more closely the bodily texture of a live minnow without the need for the application of surface coloration such as scale finish, bright colors or the like.

It is preferred to employ a bait body of hollow or shell like construction which affords a sealed interior which may be surrounded by walls whose transparency or translucency is interrupted by the presence of the opaque streaks or patches which are interspersed more or less at random through the substance of the walls, so that the appearance presented by the bait is the resultant of both reflected and transmitted light. The light reflected from the surface presents an image which displays the contrast of colors between the transparent or translucent portions of the bait and the mottled or cloudy portions, while the transmitted light passing through the entire bait body tends to bring the opaque particles or patches more sharply into relief by giving to the transparent background a luminous quality which would be absent if the bait merely displayed the effect of contrasting surface colors. This tends in a measure to simulate the appearance of an actual minnow, which frequently displays a translucent body with the opaque skeletal structure standing in clearly defined relief within the body of the minnow.

The drawing on a much enlarged scale indicates one form for the embodiment of the present invention, in which,—

Figure 1 is a side elevation of a hollow bait; and

Fig. 2 is a section taken on line 2—2 therethrough.

The bait comprises an elongated hollow body A of pyralin or other transparent or semi-transparent material, which is closed at its forward end by a cap or plug B of like material, which furnishes a point of attachment for an eye C, and the bait body at the opposite end has attached thereto a gang hook D. It will be understood that the bait body and the arrangement of the hooks may be of any standard formation, and that the present drawing is simply intended to display a simplified construction for the purpose of illustrating the principles of the present invention.

The material of which the bait body is composed comprises a ground or base E which is transparent or translucent in character, and which may be either colored or colorless, through which base are interspersed streaks or patches F of totally or partially opaque material which is interspersed and partially and unevenly distributed through the mass of material while in the plastic state, so that when the bait body is molded to the intended form the opaque particles of material will display themselves as streaks or patches which extend wholly or partially through the wall thickness and present a cloudy or variegated color effect which stands in greater or less color contrast to the transparent portions of the bait body.

In places, the opaque materials will emerge to the surface of the bait and recede therefrom in greater or less degree beneath the transparent portions, so that where contrasting colors are employed between the transparent and opaque materials employed, as for instance brown for the transparent base and white for the opaque patches, the effect presented will be that of patches or streaks which at the surface will appear to be pure white, and more deeply within the wall will shade off under the brown color of the transparent base, giving to the bait the clouded or mottled appearance in question.

The markings of the present bait are not ordinarily intended to follow any definite or precise pattern, but though appearing in haphazard arrangement nevertheless present a contrast between the transparent or luminous portions of the bait and the opaque streaks or patches, which give to the bait as a whole a peculiarly lifelike appearance resembling to a marked degree the contrasts in transparency and opacity observable in the body of a live minnow. This method of providing a variegated appearance furthermore is of advantage in that it eliminates the necessity for surface markings or finishes, and thus not only simplifies the manufacture of the bait but also eliminates the possibility of injury which might occur to a surface finish.

I claim:

An artificial lure adapted to be completely submerged when in use and having an undecorated body surface and a hook connected thereto, said body comprising a translucent partially opaque material with the opaque portions thereof incorporated therein and cooperating with adjacent portions of the body to produce by the passage of light through the body at various places a mottled surface appearance corresponding substantially to that of a live minnow submerged in water.

PAUL S. BEAR.